(12) United States Patent
Xiong et al.

(10) Patent No.: US 12,167,474 B2
(45) Date of Patent: Dec. 10, 2024

(54) USER EQUIPMENT FOR RANDOM ACCESS AND METHOD THEREOF, BASE STATION FOR RANDOM ACCESS AND METHOD THEREOF

(71) Applicant: Samsung Electronics Co., Ltd., Suwon-si (KR)

(72) Inventors: Qi Xiong, Beijing (CN); Min Wu, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 315 days.

(21) Appl. No.: 17/573,427

(22) Filed: Jan. 11, 2022

(65) Prior Publication Data

US 2022/0225429 A1 Jul. 14, 2022

(30) Foreign Application Priority Data

Jan. 12, 2021 (CN) .......................... 202110036163.5
Mar. 12, 2021 (CN) .......................... 202110272001.1
Aug. 4, 2021 (CN) .......................... 202110893364.7

(51) Int. Cl.
*H04W 74/08* (2024.01)
*H04L 27/26* (2006.01)
(Continued)

(52) U.S. Cl.
CPC ... *H04W 74/0841* (2013.01); *H04L 27/26025* (2021.01); *H04W 72/0446* (2013.01); *H04W 74/0866* (2013.01)

(58) Field of Classification Search
CPC ............ H04L 27/26025; H04L 5/0053; H04L 5/0091; H04W 72/0446; H04W 74/0833; H04W 74/0841; H04W 74/0866
See application file for complete search history.

(56) References Cited

U.S. PATENT DOCUMENTS

2018/0338308 A1   11/2018   Park et al.
2019/0150190 A1    5/2019   Kim et al.
(Continued)

FOREIGN PATENT DOCUMENTS

| KR | 10-1951678 B1 | 5/2019 |
| KR | 10-2020-0110201 A | 9/2020 |
| WO | 2019099443 A1 | 5/2019 |

OTHER PUBLICATIONS

International Search Report and Written Opinion of the International Searching Authority in connection with International Application No. PCT/KR2022/000560 issued Apr. 14, 2022, 7 pages.
(Continued)

*Primary Examiner* — Awet Haile

(57) ABSTRACT

A random access method for a user equipment (UE) and apparatus thereof, and a random access method for a base station and apparatus thereof. The random access method for the user equipment (UE) comprises: acquiring random access resource configuration information; determining a subcarrier spacing of a random access preamble; determining a random access occasion (RO) according to the random access resource configuration information and the subcarrier spacing of the random access preamble; and transmitting the random access preamble on the determined RO.

16 Claims, 13 Drawing Sheets

(51) Int. Cl.
  *H04W 72/04*   (2023.01)
  *H04W 72/0446*  (2023.01)
  *H04W 74/0833*  (2024.01)

(56) References Cited

U.S. PATENT DOCUMENTS

| | | | |
|---|---|---|---|
| 2019/0306832 A1* | 10/2019 | Si | H04J 11/0069 |
| 2020/0053785 A1 | 2/2020 | Kim et al. | |
| 2020/0154377 A1 | 5/2020 | Qian et al. | |
| 2020/0221508 A1 | 7/2020 | Huang et al. | |
| 2020/0245200 A1 | 7/2020 | Xiong et al. | |
| 2021/0120581 A1 | 4/2021 | Kim | |
| 2022/0225430 A1* | 7/2022 | Zhang | H04W 74/0833 |
| 2023/0023821 A1* | 1/2023 | Harada | H04L 5/0064 |
| 2023/0319897 A1* | 10/2023 | Li | H04W 74/0833 |
| | | | 370/329 |
| 2023/0345541 A1* | 10/2023 | Li | H04W 56/00 |

OTHER PUBLICATIONS

Supplementary European Search Report dated May 7, 2024, in connection with European Patent Application No. 22739672.8, 8 pages.

* cited by examiner

USER EQUIPMENT FOR RANDOM ACCESS AND METHOD THEREOF, BASE STATION FOR RANDOM ACCESS AND METHOD THEREOF

CROSS-REFERENCE TO RELATED APPLICATIONS

This application is based on and claims priority under 35 U.S.C. § 119(a) to Chinese patent application number 202110036163.5, filed on Jan. 12, 2021, Chinese patent application number 202110272001.1, filed on Mar. 12, 2021, and Chinese patent application number 202110893364.7, filed on Aug. 4, 2021, in the China National Intellectual Property Administration the disclosures of which are incorporated by reference herein in their entirety.

BACKGROUND

1. Field

The present disclosure relates to a field of wireless communication technology, and in particular, to a user equipment for random access and method thereof, and a base station for random access and method thereof.

2. Description of Related Art

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

SUMMARY

There is provided a random access solution for a New Radio (NR) communication system.

According to an aspect of the present disclosure, there is provided a random access method for a user equipment (UE), comprising: acquiring random access resource configuration information; determining a subcarrier spacing of the random access preamble; determining a random access occasion (RO) according to the random access resource configuration information and the subcarrier spacing of the random access preamble; and transmitting the random access preambles on the determined RO.

The determining the subcarrier spacing of the random access preamble may comprise one of: determining the subcarrier spacing of the random access preamble according to an indication for the subcarrier spacing of the random access preamble received via a higher layer signalling or a physical layer message; or determining the subcarrier spacing of the random access preamble according to a value of subcarrier spacing at a frequency position where the UE is located.

The determining the subcarrier spacing of the random access preamble may comprise: if no indication for the subcarrier spacing of the random access preamble is received, the subcarrier spacing of the random access preamble is determined according to a value of subcarrier spacing at a frequency position where the UE is located.

The determining a random access occasion (RO) according to the random access resource configuration information and the subcarrier spacing of the random access preamble may comprise at least one of: determining corresponding random access resource according to random access configuration index in the random access resource configuration information and determining the RO according to the random access resource, when the determined subcarrier spacing of the random access preamble is a first subcarrier spacing; or, determining one or more slot groups containing the random access resource and determining the configured RO according to the random access configuration index in the random access resource configuration information based on the determined one or more slot groups, when the determined subcarrier spacing of the random access preamble is a second subcarrier spacing, wherein the configured RO in each of the multiple slot groups is same, and wherein the second subcarrier spacing is greater than the first subcarrier spacing.

The determining one or more slot groups containing the random access resource may comprise at least one of: determining the one or more slot groups containing the random access resource according to an acquired bitmap indicating the slot groups containing the random access resource; determining the one or more slot groups containing the random access resource by looking up a table according to an acquired index indication, wherein the index indication is used to indicate the one or more slot groups containing the random access resource; or, determining the one or more slot groups containing the random access resource according to a position of the first slot group having the random access resource, a number of the slot groups containing the random access resource, a position relationship and an deduction direction among the slot groups containing the random access resource.

The determining the RO when the determined subcarrier spacing of the random access preamble is a second subcarrier spacing may comprise: acquiring an indication for a position of a duration T_rachduration occupied by configured random access resource in a configured random access resource configuration period T_rachperiodicity; determining the position of T_rachduration in T_rachperiodicity according to the acquired indication for the position; and determining the RO according to the random access configuration index in the random access resource configuration information, based on the position of T_rachduration in T_rachperiodicity.

The determining the position of T_rachduration in T_rachperiodicity according to the acquired indication for the position may comprise: determining a position of the T_rachduration in the random access resource configuration period according to a configured N_rachduration_index, wherein N_rachduration_index is a position index for the T_rachduration in one configured T_rachperiodicity.

The determining the RO may further comprise determining that the RO is available and/or determining that the RO is valid, wherein the determining that the RO is available may comprise at least one of: determining that the available RO is a RO with odd index, A RO with even index or every nth RO, n is a positive integer; determining the available ROs according to a bit map for the available ROs; determining the available ROs according to a configured gap value between the available ROs; wherein the determining that the RO is valid may comprise at least one of: determining the valid ROs according to a configured gap value between the valid ROs; determining the valid ROs by comparing the ROs with a configured invalid pattern; or determining the valid ROs according to deciding start position for the valid ROs.

According to another aspect of the present disclosure, there is provided a random access apparatus for a user equipment (UE), comprising: a transceiver; and a controller configured to control the transceiver to receive random access resource configuration information; determine a subcarrier spacing of a random access preamble; determine a random access occasion RO according to the random access resource configuration information and the subcarrier spacing of the random access preamble; and transmit the random access preamble on the determined RO.

The determining the subcarrier spacing of the random access preamble may comprise one of: determining the subcarrier spacing of the random access preamble according to an indication for the subcarrier spacing of the random access preamble received via a higher layer signalling or a physical layer message; or determining the subcarrier spacing of the random access preamble according to a value of subcarrier spacing at a frequency position where the UE is located.

The determining the subcarrier spacing of the random access preamble may comprise: if no indication for the subcarrier spacing of the random access preamble is received, the subcarrier spacing of the random access preamble is determined according to a value of subcarrier spacing at a frequency position where the UE is located.

The determining a random access occasion RO according to the random access resource configuration information and the subcarrier spacing of the random access preamble may comprise at least one of: determining corresponding random access resource according to random access configuration index in the random access resource configuration information and determining the RO according to the random access resource, when the determined subcarrier spacing of the random access preamble is a first subcarrier spacing; or, determining one or more slot groups containing the random access resource and determining the configured RO according to the random access configuration index in the random access resource configuration information based on the determined one or more slot groups, when the determined subcarrier spacing of the random access preamble is a second subcarrier spacing, wherein the configured RO in each of the multiple slot groups is the same, and wherein the second sub carrier spacing is greater than the first subcarrier spacing. The determining one or more slot groups containing the random access resource may comprise at least one of: determining the one or more slot groups containing the random access resource according to an acquired bitmap indicating the slot groups containing the random access resource; determining the one or more slot groups containing the random access resource by looking up a table according to an acquired index indication, wherein the index indication is used to indicate the one or more slot groups containing the random access resource; or, determining the one or more slot groups containing the random access resource according to a position of the first slot group having the random access resource, a number of the slot groups containing the random access resource, a position relationship and an deduction direction between the slot groups containing the random access resource.

The determining a random access occasion RO according to the random access resource configuration information and the subcarrier spacing of the random access preamble may further comprise: determining a RO of a first subcarrier spacing according to the random access resource configuration information; and determining a RO of a second subcarrier spacing corresponding to the RO of the first subcarrier spacing according to the RO of the first subcarrier spacing, wherein the second subcarrier spacing is N times the first subcarrier spacing.

The determining a RO of a second subcarrier spacing corresponding to the RO of the first subcarrier spacing according to the RO of the first subcarrier spacing may comprise at least one of: determining, in a time length of N ROs of the second subcarrier spacing corresponding to a time length of RO of the first subcarrier spacing, all ROs are configured to ROs of the second subcarrier spacing; receiving a RO configuration transmitted from the base station; and determining the RO of the second subcarrier spacing corresponding to the RO of the first subcarrier spacing according to the RO configuration.

Preferably, the RO configuration comprises a bitmap for the RO of the second subcarrier spacing corresponding to the RO of the first subcarrier spacing.

Preferably, the RO configuration comprises an odd RO index, an even RO index, or every nth RO index. The RO of the second subcarrier spacing corresponding to the RO of the first subcarrier spacing is determined according to the RO configuration.

Preferably, the RO configuration comprises a reference RO index and a number of ROs. The reference RO index may be an index of the first RO or an index of the last RO. The RO of the second subcarrier spacing corresponding to the RO of the first subcarrier spacing is determined according to the RO configuration and a default or configured deduction direction.

The determining the RO when the determined subcarrier spacing of the random access preamble is a second subcarrier spacing may comprise: acquiring an indication for a position of a duration T_rachduration occupied by configured random access resource in a configured random access resource configuration period T_rachperiodicity; determining the position of T_rachduration in T_rachperiodicity according to the acquired indication for the position; and determining the RO according to the random access configuration index in the random access resource configuration information, based on the position of T_rachduration in T_rachperiodicity.

The determining the position of T_rachduration in T_rachperiodicity according to the acquired indication for the position may comprise: determining a position of the T_rachduration in the random access resource configuration period bearing the random access resource according to a configured N_rachduration_index, wherein N_rachduration_ index is a position index for the T_rachduration in one configured T_rachperiodicity.

Determining the RO may further comprise determining that the RO is available and/or determining that the RO is valid, wherein the determining that the RO is available may comprise at least one of: determining that the available RO is an RO with an odd index, an RO with even index or every nth RO, n is a positive integer, according to a configured available RO index; determining the available RO according to a configured gap value of the available RO; wherein the determining that the RO is valid may comprise at least one of: determining a valid RO according to a configured gap value of the valid ROs; determining a valid RO by comparing the RO with a configured invalid pattern; or determining a valid RO according to deciding a start position for the valid RO.

According to a still further aspect of the present disclosure, there is provided a random access method for a base station, comprising: transmitting random access resource configuration information to a user equipment (UE).

The random access method for the base station may further comprise: transmitting, to the user equipment (UE), an indication for a subcarrier spacing of a random access preamble, wherein a random access resource configuration information and a subcarrier spacing of the random access preamble are used to determine a random access occasion (RO) by the UE.

According to a still further aspect of the present disclosure, there is provided a random access apparatus for a base station, comprising: a transceiver; and a controller configured to control the transceiver to transmit random access resource configuration information to a user equipment (UE).

The controller may further be configured to transmit to the UE, an indication for a subcarrier spacing of the random access preamble, wherein a random access resource configuration information and a subcarrier spacing of the random access preamble are used to determine a random access occasion (RO) by the UE.

Performance of random access can be improved by determining the corresponding random access resource with the subcarrier spacing of the random access preamble.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and/or other aspects will be apparent and more easily understood through the following detailed description for exemplary embodiments in conjunction with the accompanying drawings, in which.

DETAILED DESCRIPTION

Figure 1:
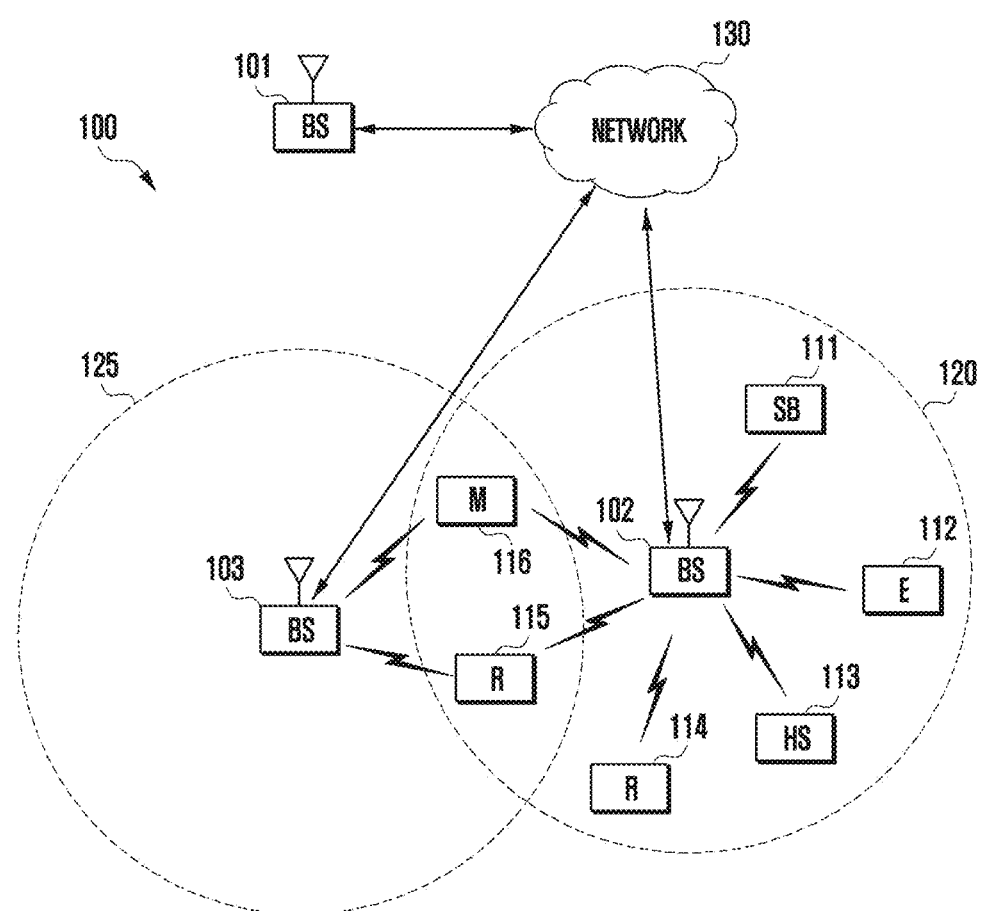
FIG. 1 illustrates an example wireless network according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device Thereafter, the present disclosure would be described in detail in connection with drawings.

The description and the accompanying drawings are provided only as examples to assist in understanding of the present disclosure. They are not intended and should not be construed as limiting the scope of the present disclosure in any way. Although some embodiments and examples have been provided, based on the contents disclosed herein, it will be apparent to those skilled in the art that the illustrated embodiments and examples can be changed without departing from the scope of the present disclosure.

It can be understood by those skilled in the art that the singular forms "one", "a", "said" and "this" used herein may also include the plural forms unless specifically stated. It should be further understood that the phrase "including/comprising" used in the description of the present application refers to the existence of the features, integers, steps, operations, elements and/or components, but does not exclude the existence or addition of one or more other features, integers, steps, operations, elements, components and/or groups thereof. It should be understood that when we say that an element is "connected" or "coupled" to another element, it may be directly connected or coupled to the another elements, or there may be intermediate elements. In addition, the "connection" or "coupling" used herein may include wireless connection or wireless coupling. The term "and/or" as used herein includes all or any unit and all combinations of one or more associated listed items.

It can be understood by those skilled in the art that unless otherwise defined, all terms used herein (including technical terms and scientific terms) have the same meaning as the general understanding of those skilled in the art to which the application belongs. It should also be understood that terms such as those defined in the general dictionary should be understood to have a meaning consistent with the meaning in the context of the prior art, and will not be interpreted in an idealized or overly formal meaning unless specifically defined as here.

Those skilled in the art can understand that the "terminal" and "terminal equipment" used here include both the equipment of wireless signal receiver, which only has the equipment of wireless signal receiver without transmitting capability, and the equipment for receiving and transmitting hardware, which has the equipment of receiving and transmitting hardware capable of two-way communication on the two-way communication link. Such a device may include: a cellular or other communication device having a single line display or a multi-line display or a cellular or other communication device without a multi-line display; PCS (Personal Communications Service), which can combine voice, data processing, fax and/or data communication capabilities; PDA (Personal Digital Assistant), which can include RF receiver, pager, Internet/intranet access, web browser, Notepad, calendar and/or GPS (Global Positioning System) receiver; a conventional laptop and/or handheld computer or other device having and/or including a RF receiver. The "terminal" and "terminal equipment" used herein may be portable, transportable, installed in vehicles (aviation, marine and/or land), or suitable and/or configured to operate locally, and/or in a distributed form, in any other location on earth and/or space. The "terminal" and "terminal device" used here can also be a communication terminal, an internet terminal and a music/video playback terminal, for example, PDA, MID (Mobile Internet Device) and/or a mobile phone with music/video playback function, as well as smart TV, set-top box and other devices.

A time domain unit (also known as a time unit) in the present disclosure may be: one OFDM symbol, one OFDM symbol group (composed of multiple OFDM symbols), a slot, a slot group (composed of multiple slots), one subframe, one subframe group (composed of multiple subframes), one system frame and one system frame group (composed of multiple system frames). It may also be an absolute time unit, such as 1 millisecond, 1 second, etc. The time unit may also be a combination of multiple granularity, for example, may be N1 slots plus N2 OFDM symbols.

A frequency domain unit in the present disclosure may be: one subcarrier, one subcarrier group (composed of multiple subcarriers), one resource block (RB), also known as physical resource block (PRB), one resource block group (composed of multiple RBs), one bandwidth part (BWP), one bandwidth part group (composed of multiple BWPs), one band/carrier, one band group/carrier group. It may also be an absolute frequency domain unit, such as 1 Hz, 1 kHz, etc. The frequency domain unit may also be a combination of multiple granularity, for example may be M1 PRBs plus M2 subcarriers.

Before an establishment of radio resource control (RRC), for example, in a random access process, the performance of the random access directly affects user's experiences. As the Sub-Carrier Spacing (SC S) increases, lengths of corresponding OFDM symbol and slot decrease. In this case, how to perform the random access is a problem to be solved.

In addition, in the operation of an unlicensed spectrum system, whether the signal could be transmitted may be related to a result of channel condition detection (for example, performing a listen before talk (LBT) operation on the channel, that is, monitoring the channel at first, and transmitting the signal if the channel is idle; and no signal is transmitted if the channel is busy). Therefore, it is necessary to provide a random access method in the unlicensed spectrum system. For example, in the unlicensed spectrum system, how to configure random access resource and how UE obtains and determines an available random access resource configuration are problems to be solved.

In order to solve at least one of the above problems, the present disclosure provides the following embodiments.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
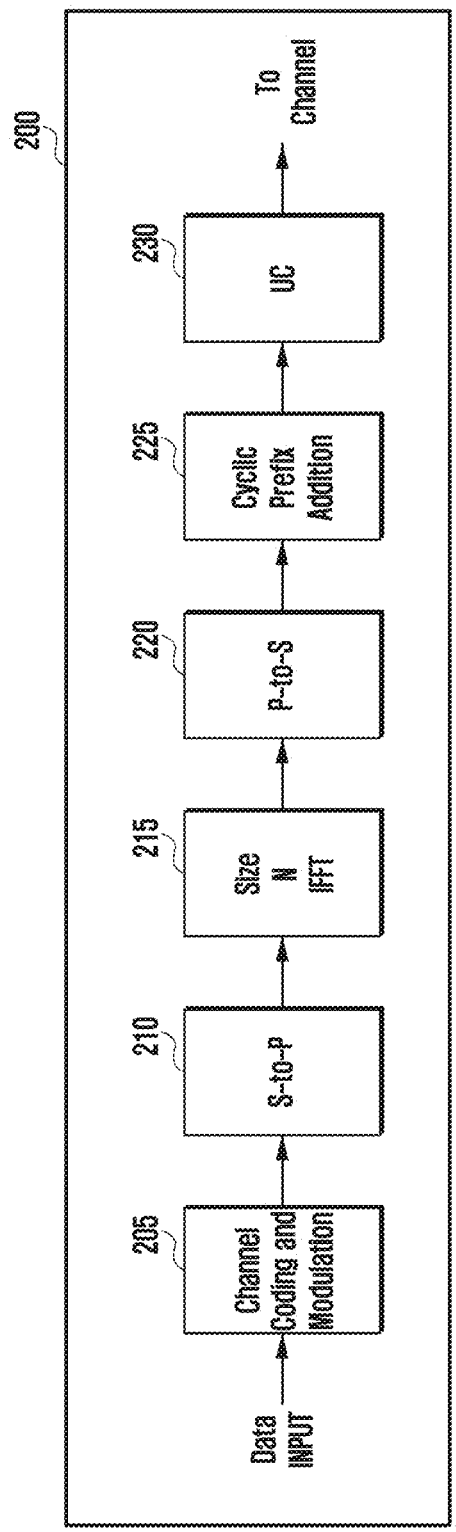
FIGS. 2a and 2b illustrate example wireless transmission and reception paths according to the present disclosure.
Figure 2B:
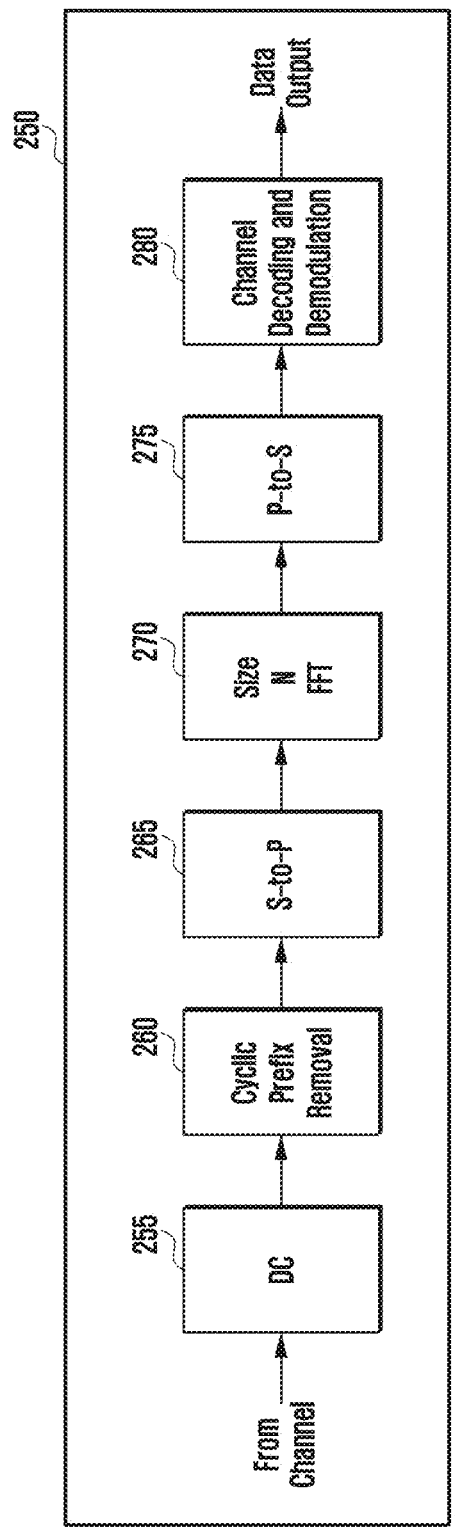

FIGS. 2a and 2b illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2a and 2b can be implemented using only hardware, or using a combination of hardware and software/firmware. As a specific example, at least some of the components in FIGS. 2a and 2b may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2a and 2b illustrate examples of wireless transmission and reception paths, various changes may be made to FIGS. 2a and 2b. For example, various components in FIGS. 2a and 2b can be combined, further subdivided or omitted, and additional components can be added according to specific requirements. Furthermore, FIGS. 2a and 2b are intended to illustrate examples of types of transmission and reception paths that can be used in a wireless network. Any other suitable architecture can be used to support wireless communication in a wireless network.

Figure 3A:
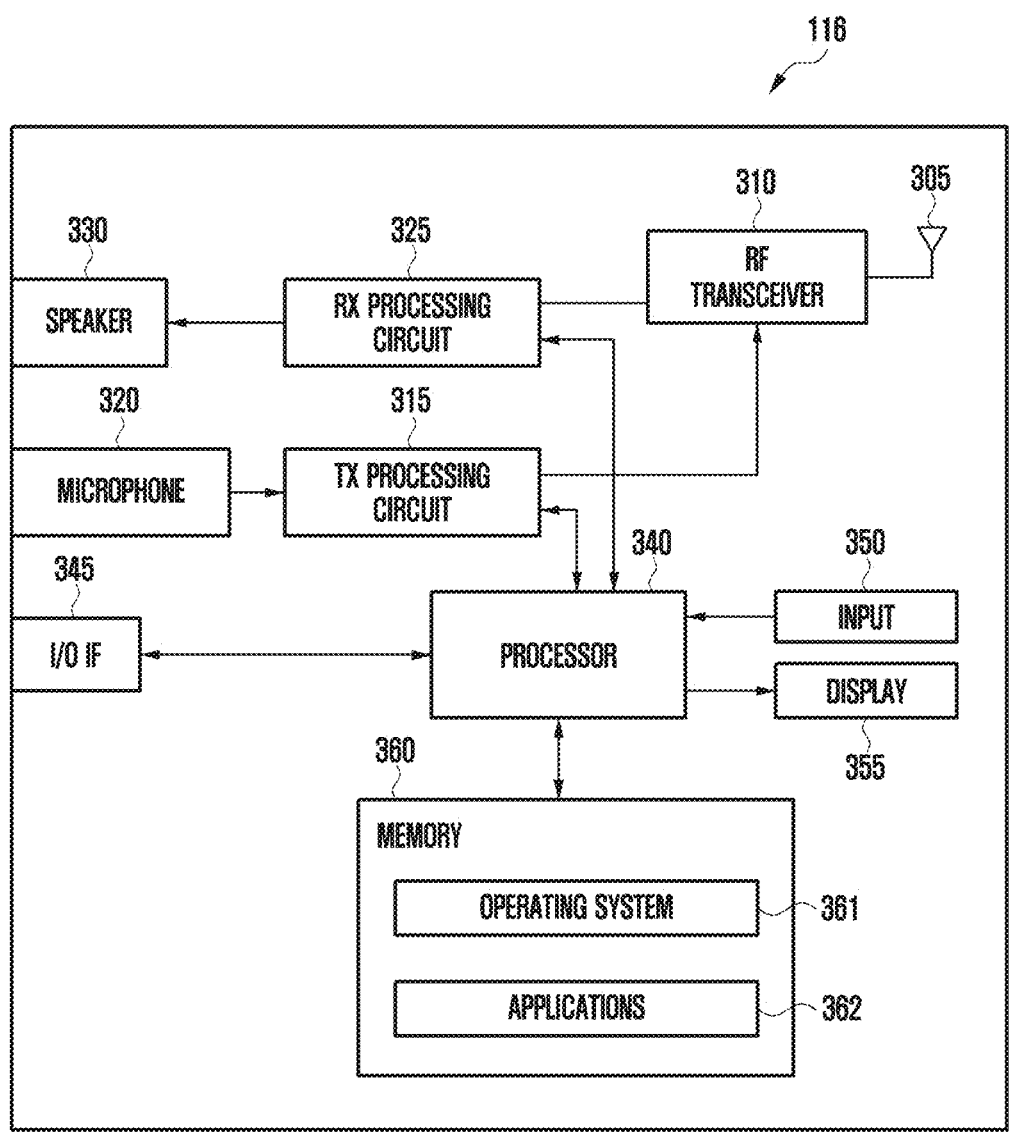
FIGS. 3a and 3b illustrate structure views for an example UE and an example base station according to the present disclosure.

FIG. 3a illustrates an example UE 116 according to the present disclosure. The embodiment of UE 116 shown in FIG. 3a is for illustration only, and UEs 111-115 of FIG. 1 can have the same or similar configuration. However, a UE has various configurations, and FIG. 3a does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3a illustrates an example of UE 116, various changes can be made to FIG. 3a. For example, various components in FIG. 3a can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3a illustrates that the UE 116 is configured as a mobile phone or a smart phone, UEs can be configured to operate as other types of mobile or fixed devices.

Figure 3B:
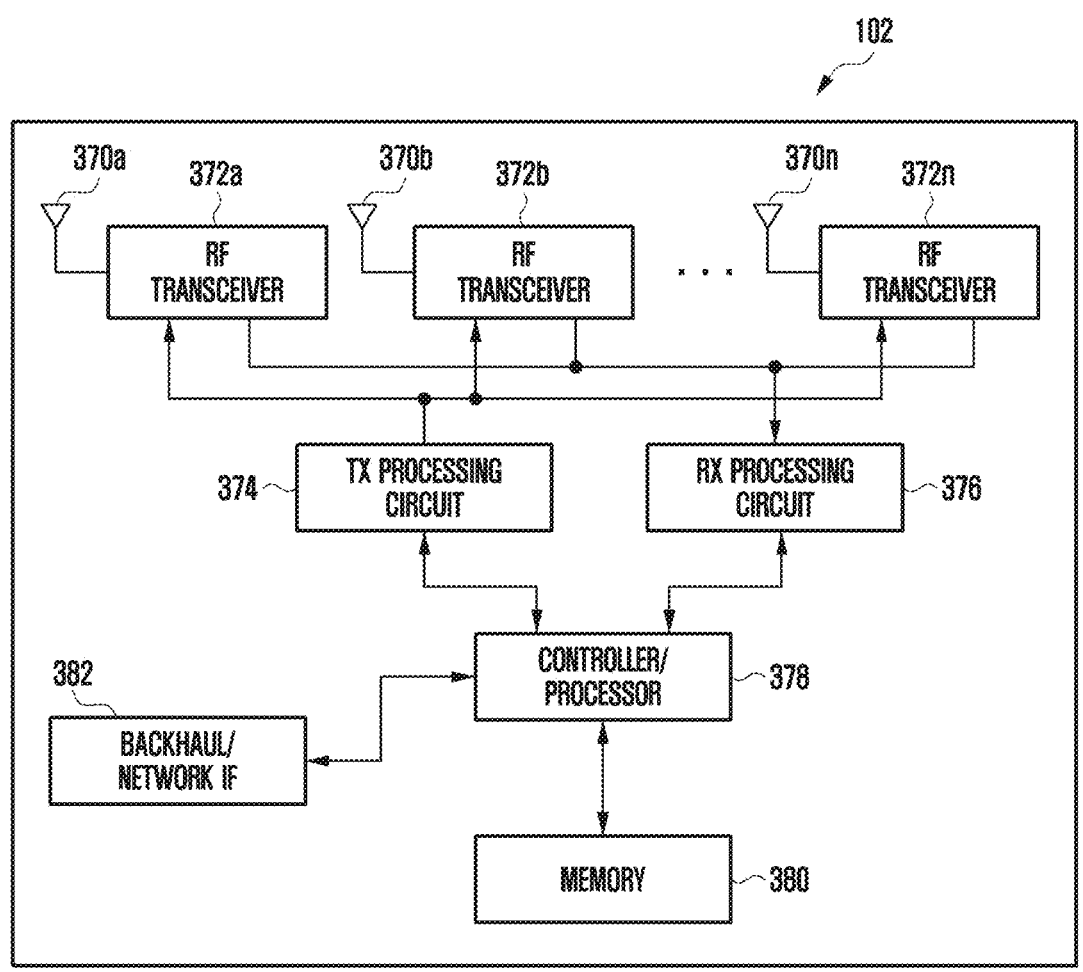

FIG. 3b illustrates an example gNB 102 according to the present disclosure. The embodiment of gNB 102 shown in FIG. 3b is for illustration only, and other gNBs of FIG. 1 can have the same or similar configuration. However, a gNB has various configurations, and FIG. 3b does not limit the scope of the present disclosure to any specific implementation of a gNB. It should be noted that gNB 101 and gNB 103 can include the same or similar structures as gNB 102.

As shown in FIG. 3b, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3b illustrates an example of gNB 102, various changes may be made to FIG. 3b. For example, gNB 102 can include any number of each component shown in FIG. 3a. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Figure 4:
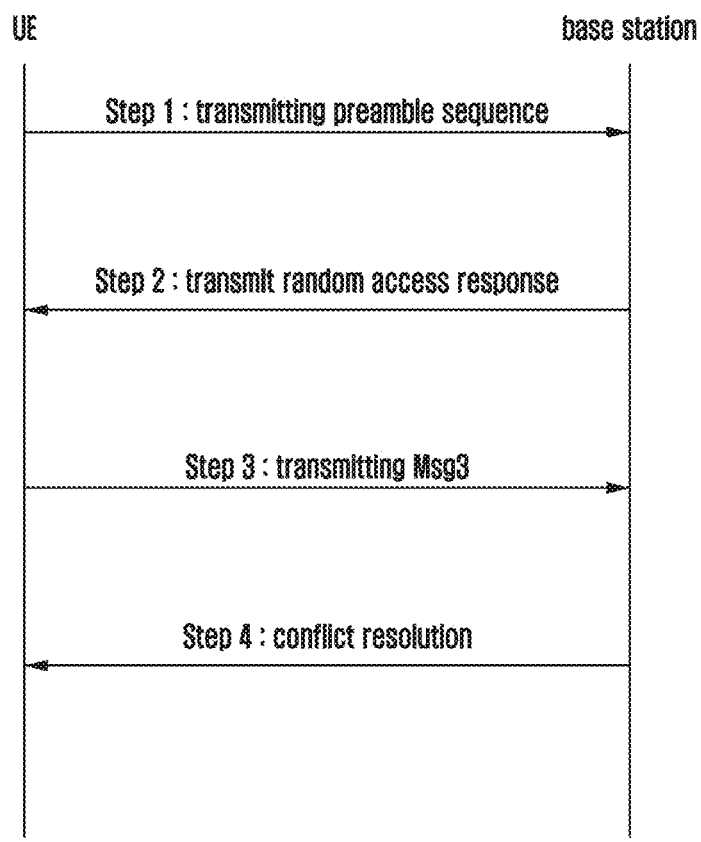
FIG. 4 illustrates a schematic view for a random access process based on contention between a UE and a base station in the LTE-A according to an embodiment of the present disclosure.

FIG. 4 illustrates a schematic view for a random access process based on contention between a UE and a base station in the LTE-A.

Transmissions in the wireless communication system includes: the transmission from the base station (gNB) to the User Equipment (UE) (called as a downlink transmission), a corresponding time slot is called as a downlink time slot; and the transmission from the UE to the base station (called as an uplink transmission), a corresponding time slot is called as an uplink time slot.

In the downlink communication of the wireless communication system, the system sends a synchronization signal and a broadcast channel to the user periodically through a synchronization signal/PBCH block (SSB), its period is called as a synchronization signal block periodicity (SSB periodicity), or a synchronization signal block group periodicity (SSB burst periodicity). Meanwhile, the base station may configure a physical random access channel (PRACH) configuration period. In this PRACH configuration period, a certain number of RACH transmission occasions (ROs), also known as random access transmission occasions or random access occasions, are configured, and following conditions are met: all SSBs could be mapped to the corresponding ROs within a mapping association period (a certain length of time), all SSBs in an SSB periodicity could just be mapped to required random access resources in a mapping cycle from one SSB to RO, and there may be one or more mapping cycles in a mapping association period. A mapping association pattern period from one SSB to RO includes one or more mapping association periods, and mapping patterns from SSB to RO in each mapping association pattern period are the same.

In a new radio (NR) communication system, before a wireless resource control is established, for example, in a process of random access, performances of the random access directly affect the user's experience. In a traditional wireless communication system, such as LTE and LTE-advanced (hereinafter referred to as LTE-A), the random access process is applied to multiple scenarios such as initial connection establishment, cell handover, uplink reestablishment, RRC connection reestablishment, etc., and is divided into a contention-based random access and a contention free-based random access according to whether the user monopolizes a preamble sequence resource. In the contention-based random access, each user selects a preamble sequence from among a same preamble sequence resource in a process of attempting to establish an uplink, therefore it may happen that multiple users choose the same preamble sequence to transmit to the base station. Therefore, a conflict resolution mechanism is an important research direction in the random access. Specifically, how to reduce a conflict probability and how to quickly solve occurred conflicts are key indicators affecting the performance of random access.

The contention-based random access process in the LTE/LTE-A has four steps, as illustrated in FIG. 4. In the first step, the UE randomly selects a preamble sequence from a preamble sequence resource pool to transmit to the base station. The base station performs a correlation detection on received signals so as to identify the preamble sequence transmitted by the UE. In the second step, the base station transmits a Random Access Response (RAR) to the UE, which includes a random access preamble sequence identifier, a Timing Advance instruction determined according to a time delay estimation between a UE and a base station, a Cell-Radio Network Temporary Identifier (C-RNTI) and a time-frequency resource allocated for a next uplink transmission of the UE. In the third step, the UE transmits a third message (Msg3) to the base station according to information in the RAR. The Msg3 comprises information such as an identifier of the UE, a RRC connection request and the like, wherein the identifier of the UE is unique for the UE and used to solve the conflict. In the fourth step, the base station transmits, to the UE, a conflict resolution identifier including the identifier of UE which won in the conflict resolution. If the UE detects its own identifier, it upgrades the temporary C-RNTI to a C-RNTI and transmits an ACK signal to the base station, completes the random access process and waits for being scheduled by the base station. Otherwise, the UE may start a new random access process after a delay period.

For the contention free-based random access process, the base station may allocate a preamble sequence to the UE because it knows the identifier of the UE. Therefore, instead of randomly selecting a preamble sequence, the UE may use the preamble sequence allocated by the base station when the UE transmits the preamble sequence. The base station may transmit a corresponding random access response including information such as the Timing Advance, uplink resource allocation and the like, after detecting the allocated preamble sequence. After receiving the random access response, the UE determines that uplink synchronization has been completed and waits for being further scheduled by the base station. Therefore, the contention free-based random access process comprises only two steps: transmitting the preamble sequence in the first step; and transmitting the random access response in the second step.

The random access process in the LTE/LTE-A is suitable for the following scenarios.
1. Initial access in RRC IDLE state;
2. Re-establishment of RRC connection;
3. Cell handover;
4. Downlink data arrives and the random access process is request in RRC connection state (when the downlink is in synchronization);
5. Uplink data arrives and the random access process is request in RRC connection state (when the uplink is in non-synchronization or there is no resource allocated to a scheduling request in PUCCH resources);
6. Location.

In a system with a higher subcarrier spacing (SCS) (for example, in a system with high frequency band greater than 52.6 GHz), corresponding OFDM symbol and a slot length are shortened as increasing of the subcarrier spacing. In this case, how to obtain the configuration information of the random access resource is a problem to be solved.

In addition, in the operation of the unlicensed spectrum system, whether the signal could be transmitted may be related to a result of channel condition detection (for example, performing a listen before talk (LBT) operation on the channel, that is, monitoring the channel at first, and transmits the signal if the channel is idle; and no signal is transmitted if the channel is busy). Therefore, how to configure the random access resource and how the UE obtains and determines an available random access resource configuration is a problem to be solved.

The present disclosure proposes a random access method applicable to a situation where the higher PRACH subcarrier spacing is used.

Figure 5:
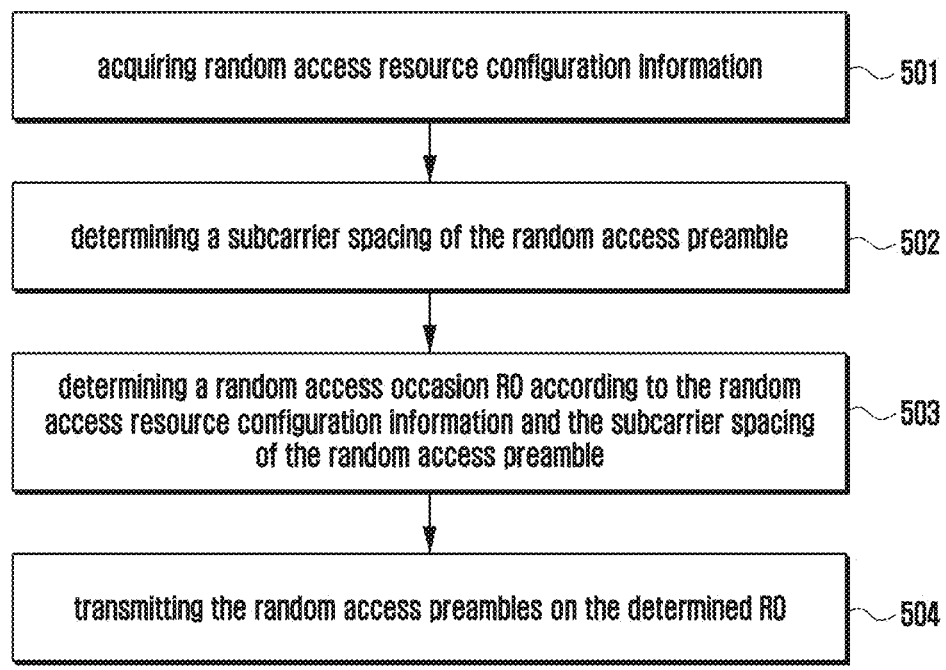
FIG. 5 illustrates a flowchart of a random access method of a UE according to an embodiment of the present disclosure.

FIG. 5 illustrates a flowchart of a random access method of a UE according to an embodiment of the present disclosure.

The UE acquires random access resource configuration information in step 501, determines a subcarrier spacing of the random access preamble in step 502, determines a random access occasion (RO) according to the random access resource configuration information and the subcarrier spacing of the random access preamble in step 503, and transmits the random access preamble on the determined RO in step 504.

Figure 6:
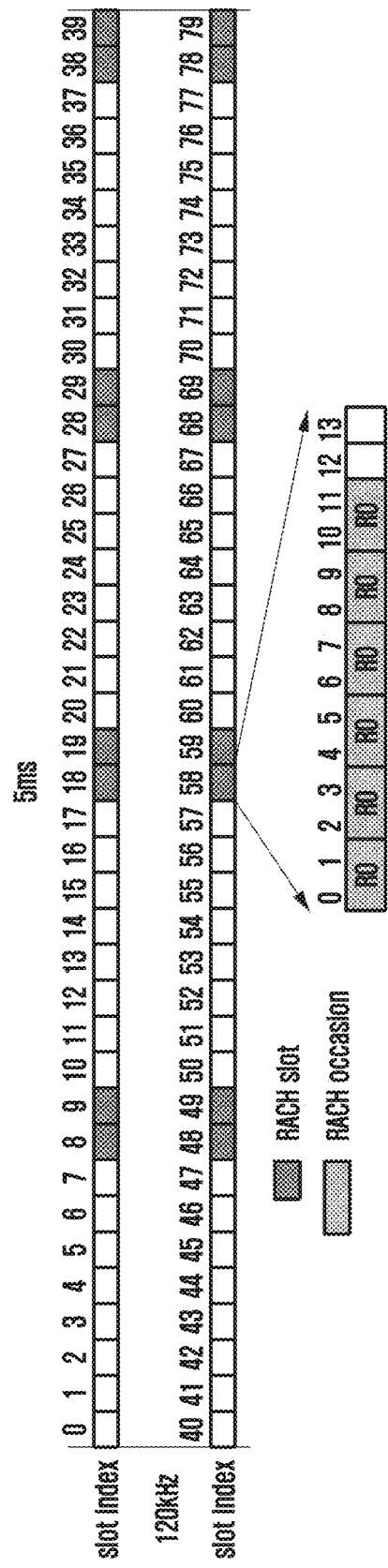
FIG. 6 illustrates a view of an example of random access resource configuration in case that a subcarrier spacing on PRACH is 120 kHz, according to an embodiment of the present disclosure.
Figure 7:
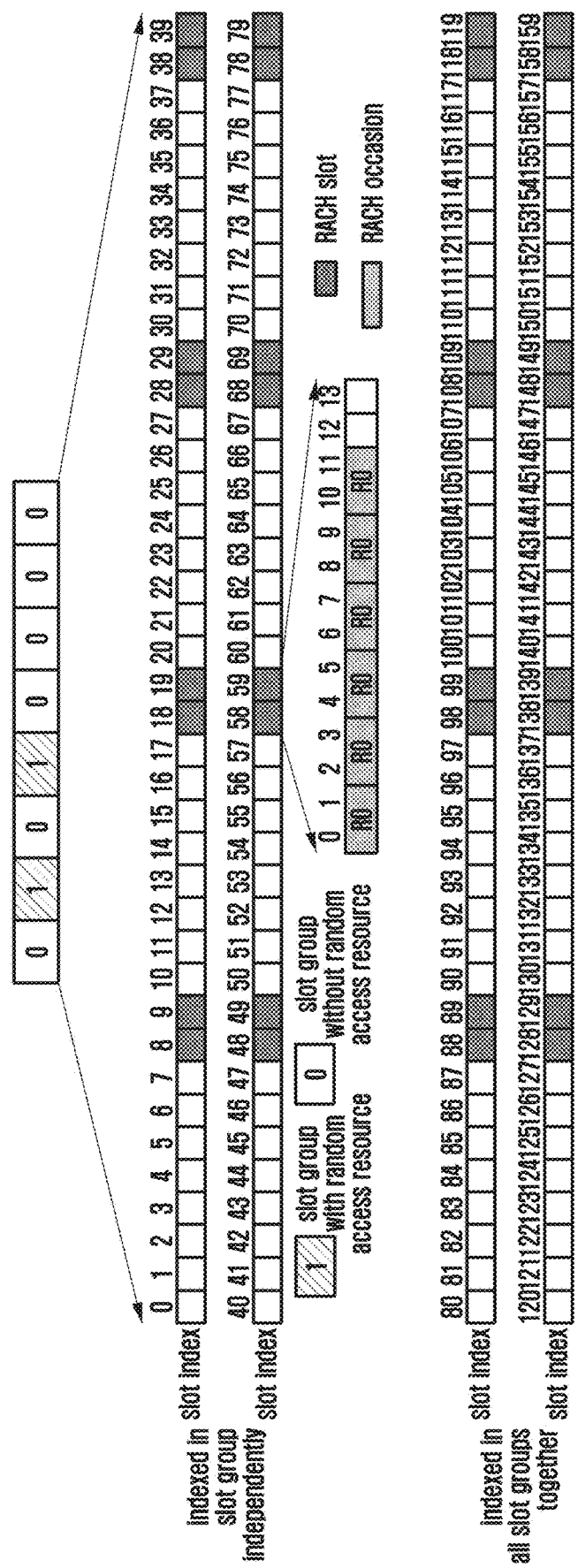
FIG. 7 illustrates a view of an example for acquiring of a random access configuration by a bitmap indication according to an embodiment of the present disclosure.

FIG. 6 illustrates a view of an example of random access resource configuration in case that a PRACH subcarrier spacing is 120 kHz, according to an embodiment of the present disclosure. FIG. 7 illustrates a view of an example for acquiring a random access configuration by using a bitmap indication. The random access resource configuration method according to the embodiment of the present disclosure would be further described in connection with FIGS. 6 and 7.

In some communication systems, a first subcarrier spacing (e.g. 60 kHz or 120 kHz) may be used in a communication system operating on a lower frequency band, while in a communication system operating on a higher frequency band, a second subcarrier spacing (e.g. 240 kHz, 480 kHz and 960 kHz) may be used in addition to the first subcarrier spacing, and a length of a corresponding time unit (e.g. an OFDM symbol, a slot) may be shortened accordingly. For example, when the subcarrier spacing is 15 kHz, the length of one slot is 1 ms, while when the subcarrier spacing is 120 kHz, the length of one slot is 0.125 ms. Therefore, when the subcarrier is 960 kHz, the length of one slot is only 0.015625 ms. In this case, how to configure the random access resource is a problem to be solved. The present disclosure provides a configuration manner of a random access resource (a RACH resource), which can be more suitable for the case in which the second subcarrier spacing is used.

If the second subcarrier spacing is used, such as 480 kHz and 960 kHz (these two values are taken as an example value of the second subcarrier spacing in the present disclosure, but it is not limited to these two values in practice, and the lengths of the corresponding OFDM symbols are ¼ and ⅛ of the length of the OFDM symbol corresponding to the subcarrier spacing of 120 kHz, respectively), the configuration related to random access (also known as random access configuration or random access resource configuration) that may be obtained by the UE includes at least one of the following.

An indication of a subcarrier spacing of a random access preamble. The UE may determine a value of the subcarrier spacing of the random access preamble according to the indication. Details of the indication method may be at least one of the following.

Direct indication of the value of the subcarrier spacing of the random access preamble (for example, through a higher layer signalling (such as a system message), or through physical layer information such as DCI and the like). For example, a 2-bit indication: 00 represents 120 khz, 01 represents 480 kHz, 10 represents 960 khz, and 11 is null; Or only 1 bit is used to indicate, 0 represents 480 khz or 960 khz. Preferably, an existing subcarrier spacing indication bit is redefined. For example, an indication of message 1 subcarrier spacing msg1-SubcarrierSpacing is redefined in the following manner. In a frequency range 1 (FR1), the msg1-SubcarrierSpacing indicates 15 khz or 30 khz, and in a frequency range 2, the msg1-SubcarrierSpacing indicates 60 khz or 120 khz; in a frequency range 3 (or 4), the msg1-SubcarrierSpacing indicates 120 khz or 480 khz (or 120 khz or 960 khz; or 960 khz or 480 khz). Preferably, when the indication of subcarrier spacing of the random access preamble is not configured, the UE determines that the subcarrier spacing of the random access preamble is 120 khz.

Indication of the value of the subcarrier spacing of the random access preamble according to a value of subcarrier spacing (uplink or downlink, or the larger one or smaller one in the uplink and the downlink) on a frequency position (for example, a BWP or a carrier) at where the UE is located. For example, if the current BWP is an initial access BWP and an uplink SCS on the initial access BWP is 120 kHz, the UE determines that the subcarrier spacing of the random access preamble is also 120 kHz.

Preferably, when the direct indication is not configured, the UE determines the value of the subcarrier spacing of the random access preamble according to the value of subcarrier spacing on the frequency position (for example, a BWP or a carrier) at where the UE is located.

Configuration of random access occasion (RACH occasion, RO), wherein a RO and a RO pattern have the same meaning. Details of the configuration mode of the RO may be at least one of the following.

When the determined subcarrier spacing of the random access preamble is a first subcarrier spacing (for example, 120 kHz, or other values, such as 60 kHz, etc.), a random access configuration when the subcarrier spacing is 120 kHz is obtained by the UE by looking up a table (according to a random access configuration table corresponding to FR2 (frequency range 2)) according to an obtained random access configuration index (prach-ConfigurationIndex) and by a corresponding rule, and an example of the random access configuration table is shown in Table 1 below. For example, the random access configuration index 3 in Table 1 corresponds to the random access configuration when the subcarrier spacing is 120 kHz, as shown in FIG. 6. In the random access configuration, one PRACH frame is 10 ms, which includes a total of 80 slots; among them, the slot indexes configured as PRACH slots are 8, 9, 18, 19, 28, 29, 38, 39, 48, 49, 58, 59, 68, 69, 78, 79. There are a total of 6 ROs starting from the first symbol in each PRACH slot.

When the determined subcarrier spacing of the random access preamble is a second subcarrier spacing (e.g., 960 kHz, or other values such as 240 kHz, 480 KHZ, etc.), the random access configuration of 80 slots (i.e., in the case of 120 kHz) determined according to the obtained random access configuration index may be used as a reference (herein, the 80 slots corresponding to 120 kHz are used as an example, or other references, such as 40 slots corresponding to 60 kHz, may also be used) so as to determine the random access configuration of 640 slots (i.e., in the case of 960 kHz, n=960/120=8, N*80=640 slots). Details of the determination manner may be at least one of the following.

The random access configuration of N slot groups (i.e., one slot group represents 80 slots) is determined by using a bitmap. For example, N=8, that is, there are 8 bits for indicating. For example, a bit value of 0 represents that there is no random access resource in this slot group; a bit value of 1 represents that there is a random access resource in this slot group (and the configuration of the random access resource is the random access configuration in the 80 slots (i.e., in the case of 120 kHz) determined according to the obtained random access configuration index). For example, the value of an 8-bitmap is 01010000, and it indicates that there is a random access resource in the second and fourth slot groups and no random access resource in remaining slot groups. Preferably, among the N slot groups, it slots may index independently in a slot group (that is, in each slot group, slots are indexed separately from 0); Alternatively, all slots may be indexed together, that is, a slot is indexed from 0 starting from the first slot of the first slot group, and the slots in all slot groups are indexed in chronological order, as shown in FIG. 7.

The random access configurations of N slot groups (i.e., one slot group represents 80 slots) are determined by looking up a table. For example, one row of a table with 16 rows is indicated by 4 bits, wherein one row of the table represents one combination of slot groups, as shown in Table 2 below. The number of rows of the table may be changed to more or less (indicated by a greater number of bits, for example, 5 bits may indicate 32 rows; or indicated by a smaller number of bits, for

TABLE 1

| random access configuration index | Preamble format | $n_{SFN}$ mod x = y | | Slot number RACH slot index value | Starting symbol start position of first RO in a slot | Number of PRACH slots within a 60 kHz slot | $N_t^{RA,slot}$, number of time-domain PRACH occasions within a PRACH slot | $N_{dur}^{RA}$, PRACH duration number of OFDM symbols occupied by one RO |
|---|---|---|---|---|---|---|---|---|
| | | x (period) | y | | | | | |
| 0 | A1 | 16 | 1 | 4, 9, 14, 19, 24, 29, 34, 39 | 0 | 2 | 6 | 2 |
| 1 | A1 | 16 | 1 | 3, 7, 11, 15, 19, 23, 27, 31, 35, 39 | 0 | 1 | 6 | 2 |
| 2 | A1 | 8 | 1, 2 | 9, 19, 29, 39 | 0 | 2 | 6 | 2 |
| 3 | A1 | 8 | 1 | 4, 9, 14, 19, 24, 29, 34, 39 | 0 | 2 | 6 | 2 |
| ...... | | | | | | | | |
| 255 | A3/B3 | 1 | 0 | 1, 3, 5, 7, ... , 37, 39 | 2 | 1 | 2 | 6 | example, 3 bits may indicate 8 rows). The specific slot group indication of each row may be replaced as reserved (i.e., there is no special indication for the time being), or other possible one slot group or a combination of multiple slot groups, and an example table is omitted.

TABLE 2

Indication of random access slot group

| index | Allowed value for slot group index (combination) |
|---|---|
| 0 | all slot groups |
| 1 | slot group index 0 |
| 2 | slot group index 1 |
| 3 | slot group index 2 |
| 4 | slot group index 3 |
| 5 | slot group index 4 |
| 6 | slot group index 5 |
| 7 | slot group index 6 |
| 8 | slot group index 7 |
| 9 | all even indexed slot groups |
| 10 | all odd indexed slot groups |
| 11 | slot group 0, 4 |
| 12 | slot group 1, 5 |
| 13 | slot group 2, 6 |
| 14 | slot group 3, 7 |
| 15 | reserved |

The random access configuration of N slot groups is determined according to a position indication of the first slot group having the random access resource (i.e., the start slot group index indication) and/or a number indication of slot groups having random access resource and/or a position relationship indication of different slot groups having random access resource (e.g. consecutive or with a certain space). For example, if the indicated slot group index of the first slot group with random access resource is 1, the indicated number of slot groups having random access resource is 3, and the indicated location relationship of different slot groups having random access resource is consecutive, the UE may determine that the random access resource is configured in three consecutive slot groups (slot group indexes 1, 2, 3) starting from the slot group index 1. In another example, if the indicated slot group index of the first slot group having random access resource is 1, the indicated number of slot groups having random access resource is 3, and the indicated location relationship of different slot groups having random access resource is being spaced by 1 slot group, the UE may determine that random access resource is configured in the slot groups with slot group index of 1, 3 and 5. Preferably, in determining the slot groups configured with random access resource, it may also be deduced from back to front. For example, if the indicated slot group index of the first slot group having random access resource is 7, the indicated number of slot groups having random access resource is 3, and the indicated location relationship of different slot groups having random access resource is consecutive, the UE may determine that the random access resource is configured in three reverse consecutive slot groups (slot indexes 5, 6, 7) starting from slot group index 7. Preferably, the position indication of the first slot group having random access resource and/or the number indication of slot groups having random access resource and/or the position relationship indication of different slot groups having random access resource, and/or the indication of deduction direction (forward or reverse) may be obtained explicitly through a bit domain (in a higher layer signalling and/or a DCI configuration), and/or determined by default/pre-defined rules, and/or derived by calculation formulas.

Preferably, it may indicate that one or more random access occasions of 960 kHz in N=8 possible random access occasions of 960 kHz corresponding to random access occasions ROs (time length occupied) of 120 kHz (the RO time length of the 120 kHz corresponds to N RO time lengths of 960 kHz) is the actual random access configuration, in which 120 kHz and 960 kHz are only examples of subcarrier spacings. Details of the manner may be at least one of the following: all 8 random access occasions are configured ROs by default, as shown in the example in (a) in FIG. 10.

The RO actually configured is obtained through the ROs specifically configured by the base station. For example, by means of a bitmap, and an 8-bitmap in this example, as shown in (b) in FIG. 10, 10010010, where '1' represents the RO actually configured and '0' represents the RO not actually configured. In this way, the position of the RO actually configured may be very flexible, but it takes a large signalling overhead. Preferably, the signalling overhead may also be reduced by determining the actually configured ROs according to whether the base station configures an odd RO index value, an even RO index value, or every nth RO.

It may be determined with the index of the first RO actually configured by the base station and/or the number of ROs N_ro, for example, the index of the first RO configured is RO3, and N_ro is 4, then ROs 3, 4, 5 and 6 are the actually configured ROs. Preferably, when the number of ROs is not configured (i.e., only the index of the first RO is actually configured), the UE uses a default (fixed) number of ROs. Preferably, when the index of the first RO actually configured is not configured (i.e., only with the number of ROs configured), the UE determines corresponding configured N_ro ROs as the actually configured ROs, from the forward direction (i.e., starting from the first RO) or the reverse direction (i.e., starting from the last RO) according to a default or configured deduction direction. For example, in a case of reverse direction and N_ro=6, the UE determines that the last six ROs are the actually configured ROs, as shown in the example in (c) in FIG. 10. Preferably, the number of ROs N_ro may also be a default value (when there is no configured value), for example, the default value is N_ro=4 and in a case of reverse direction, the UE takes the last four ROs as the actually configured ROs. Preferably, it may be indicated by looking up a table similar to table 2, that is, replacing the slot group index in Table 2 with an RO index.

The configuration of actual RO of 960 kHz corresponding to one RO of 120 kHz obtained in the above way is applied to all other ROs of 120 kHz, to obtain ROs of 960 kHz corresponding thereto, that is, the configuration of actual RO of 960 kHz corresponding to each RO of 120 kHz is the same.

When the determined subcarrier spacing of the random access preamble is a second subcarrier space (e.g., 960 kHz, or other values such as 240 kHz, 480 kHz, etc.), the random access configuration in 80 slots (i.e., one slot group) at 960 kHz may be determined by taking the random access configuration in the 80 slots (i.e., in the case of 120 kHz) determined according to the obtained random access configuration index as reference. At this time, it is not necessary to consider the case in which the whole RACH frame is configured as 10 ms. Details of the determination manner may include at least one of the following.

Determined by a time duration T_rachduration occupied by a configured RACH (because the random access resource in one random access resource configuration period T_rachperiodicity is within a time length occupied by the RACH), T_rachduration may also be called as a RACH frame time length T_rachframe. For example, T_rachduration may be configured separately, or may be configured differently by changing a length T_SF of a system frame (i.e., given T_rachduration is the same as the length of the system frame). A value range of T_rachduration may be one or more of $\{1.25, 2.5, 5, 10\}$ ms, and/or obtained by multiplying a scaling factor by the time length of the system frame. For example, the configured scaling factor may be one or more of $\{1/8, 1/4, 1/2\}$.

Determined by the configured random access resource allocation period T_rachperiodicity. For example, it may be indicated by separately adding an indication of the random access resource configuration period, or it may be determined by applying the configured scaling factor and/or offset to the existing random access resource configuration period. For example, the separately added random access resource allocation period may be one or more of $\{1.25, 2.5, 5\}$ ms; alternatively, the configured scaling factor may be one or more of $\{1/8, 1/4, 1/2\}$ (for example, if the configured scaling factor is 1/8 and the configured random access resource configuration period is 10 ms, the random access resource configuration period actually determined by the UE is 10/8=1.25 ms), and/or the configured offset may be one or more of $\{8.75, 7.5, 5\}$ ms.

Preferably, the UE may determine the specific location of the configured random access resource in one RACH configuration period by an indication of the location of the configured random access resource. Details of the determination manner may be at least one of the following.

Determining the system frame where the configured RACH resource is located. It may determine whether a system frame with a given system frame number SFN contains a RACH resource by configuring a value of the SFN mod (T_rachperiodicity/10 ms). For example, if the length of system frame is 10 ms, T_rachperiodicity=40 ms, and the configured SFN mod (T_rachperiodicity/10 ms)=2, the system frame has a RACH resource only when the SFN is a multiple of 4+2. In addition, when T_rachperiodicity=5 ms and the system frame is still 10 ms, that is, when the length of system frame is greater than T_rachperiodicity (and/or a positive integer multiple of T_rachperiodicity), it indicates that there are RACH resources in each system frame.

Determining a position of duration occupied by a configured RACH in one RACH configuration period. The specific position of the duration occupied by the configured RACH in one RACH configuration period may be determined by configuring a value of N_rachduration_index, where N_rachduration_index is an index value of the position of the duration occupied by one RACH in one RACH configuration period, and its value range is $\{0, 1 \ldots T\_rachperiodicity/T\_rachduration\}$. For example, the configured T_rachperiodicity=5 ms, T_rachduration=1.25 ms, then the value range of N_rachduration_index is $\{0, 1, 2 \ldots 3\}$. That is, when the configured N_rachduration_index=0, it indicates that the first 1.25 ms in one RACH configuration period of 5 ms is the duration in which the RACH is located. Preferably, the N_rachduration_index may be indicated by the bitmap described above, or obtained by looking up a table. The method is the same and details are omitted.

Preferably, when the RACH configuration period is greater than the length of the system frame, the system frame where the configured RACH resource is located may be determined according to the above method at first, and then the specific location of the duration occupied by the RACH resource in the system frame bearing the random access resource is obtained according to the configured N_rachduration_index, that is, the N_rachduration_index in the above method is the index value of the position of the duration occupied by the RACH on the system frame bearing the random access resource, and its value range is $\{0, 1 \ldots T\_SF/T\_rachduration\}$.

In the process of determining the above random access resource configuration information, reuse of the random access resource index in the random access resource configuration information saves the signaling overhead and assists the UE to quickly determine the random access resource in the case of a high subcarrier spacing. In addition, since the random access configuration is reused to the greatest extent, there is no need to redesign the random access resource configuration information table.

In the RO configuration, in order to ensure that the UE has enough time for a LBT operation before the selected RO, a large enough space is needed to be formed between two ROs. RO may be indicated in at least one of the following ways.

The index of available ROs in one slot are explicitly notified through a bit domain (in a higher layer signalling and/or DCI configuration). When notifying an available RO in one slot, the available RO is configured as a RO with odd index, or a RO with even index, or every nth RO; n is a positive integer.

The bitmap is used to inform which ROs in one slot are available. 1 represents available and 0 represents unavailable. For example, when there are 6 ROs in one slot, by indicating with the bitmap of 6 bits 010101, the UE may determine that ROs with index 1, 3 and 5 are available ROs. Preferably, the number of bits required by the bitmap is determined by a preamble format and/or a bit number indication required by the bitmap (e.g., 0 or 1), as shown in Table 3. For example, when the preamble format is A1 and the required number of bits is indicated as 0, the UE determines that the required number of bits for the bitmap is 6. Preferably, when the required bit number indication is not configured, the UE determines that the value of the required bit number is 1; Preferably, for a preamble format of a long sequence and a B4 format, the UE determines that the value of required bit number is 1; Preferably, the required bit number may also be represented by 'number of ROs in one PRACH slot' in a row corresponding to the random access resource configuration index in the random access resource configuration table (e.g., Table 1).

TABLE 3 bit number required by bitmap

| preamble format | required bit number indication "0" | required bit number indication "1" |
|---|---|---|
| A1, B1, A1/B1 | 6 | 3 |
| A2, A2/B2 | 2 | 3 |
| A3, A3/B3, C2 | 1 | 2 |
| C0 | 3 | 7 |

Indicated by a configured available RO gap value. The UE may determine the available ROs according to the configured available RO gap value. For example, in a case where the configured available RO gap value is 2 OFDM symbols, and there are 6 consecutive ROs in one slot and each RO occupies 2 OFDM symbols (e.g. PRACH format A1/B1), the next RO spaced by at least 2 OFDM symbols from the first RO (end position) is an available RO, that is, the third RO, and the RO spaced at least 2 OFDM symbols from the third RO (end position) is a next available RO, that is, the fifth RO, and so on. Preferably, the configured available RO gap value indication may be explicitly notified by the base station to the UE through the bit domain, or may be calculated by the UE through a formula [T_LBT/T_OFDMsymbol] based on a time T_LBT required for the LBT, where T_OFDMsymbol is a time of one OFDM symbol, [ ] is a ceiling operation or a floor operation on a number within [ ]. Preferably, a calculated starting position (i.e., the first available RO) may be the first RO within a period of time, the period of time may be at least one of the following:

one RACH configuration period;
one mapping cycle from downlink signal to RACH;
one mapping association period from downlink signal to RACH;
one mapping association pattern period from downlink signal to RACH;
one system frame; and
one duration occupied by RACH.

Preferably, the ROs configured in each of the plurality of slot groups are the same.

Preferably, the RO indication modes in the above methods may be applied to the ROs in one slot, or may be applied to the ROs to which each downlink signal is mapped after completing a mapping between the downlink signals (such as SSB, CSI-RS) and the ROs.

Preferably, it may also be determined that there is an enough gap value between two available ROs by deciding the validity of the configured ROs. Details of the determination manner may be at least one of the following.

Indicated by a configured gap value of valid ROs. When a gap value between a configured RO and a previous valid RO is larger than (or not less than) the configured gap value of the valid ROs, the UE may determine that the configured RO is valid. For example, in a case where the configured gap value of the valid ROs is 2 OFDM symbols, there are 6 consecutive ROs in one slot, and each RO occupies 2 OFDM symbols (e.g. the PRACH format A1/B1), if the spacing between the first RO (end position) and the second RO in the current slot is less than 2 OFDM symbols, the second RO is an invalid RO, the third RO is a valid RO, and the RO spaced by at least 2 OFDM symbols from the third RO (end position) is the next valid RO, that is, the fifth RO, and so on. Preferably, an indication of the configured gap value of the valid ROs may be explicitly notified to the UE by the base station through the bit domain, or may be calculated by the UE through a formula [T_LBT/T_OFDMsymbol] based on a time T_LBT required for the LBT, where T_OFDMsymbol is a time of one OFDM symbol, [ ] is a ceiling operation or a floor operation on a number within [ ].

By comparing with a configured invalid pattern. That is, when one RO does not overlap (in time domain) with the invalid pattern configured by the base station (and/or the spacing is not less than or is greater than a certain threshold value), the UE determines that the RO is a valid RO, otherwise, it is an invalid RO.

Preferably, a deciding start position (i.e., the first valid RO) of the valid ROs may be a first available RO in a period of time, and the period of time may be at least one of the following.

one RACH configuration period;
one mapping cycle from downlink signal to RACH;
one mapping period from downlink signal to RACH;
one mapping pattern period from downlink signal to RACH;
one system frame; and
one duration occupied by RACH.

Preferably, the availability may be decided first and then the validity is decided, or on the contrary, the validity is decided first and then the availability is decided.

By determining the availability and/or validity of the ROs described above, there may be sufficient spacing between ROs for the LBT operation.

After the UE transmits the random access preamble on a selected RO, it may need to search a random access feedback in a determined RAR window, and need to search whether there is a PDCCH scrambled with a matching RA-RNTI (or MSGB-RNTI for two-step random access) in a configured search space. For a configured RACH resource in the case that a higher SCS is used, a calculation method of RA-RNTI may be one of the following.

When one RACH period may contain up to 640 slots (taking 960 kHz as an example), when the slots are indexed independently in the slot group: RA-RNTI=1+s_id+14×t_id+14×80×f_id+14×80×8×slotgroup_id+14×80×8×8×ul_carrier_id, where s_id is the first OFDM symbol index of the selected RO (0≤s_id<14), t_id is the index of the slot in the slot group where the selected RO is located (0≤t_id<80), f_id is the index value of the selected RO in the frequency domain (0≤f_id<8), slotgroup_id is the index of the slot group where the selected RO is located (0≤slotgroup_id<8), and ul_carrier_id is the index of the carrier for random access (0 represents the normal uplink carrier and 1 is the supplementary uplink carrier). Preferably, the slotgroup_id and the f_id may be exchanged.

when one RACH period may contain up to 640 slots (taking 960 kHz as an example), when the slots are indexed together (or collectively): RA-RNTI=1+s_id+14×t_id+14×640×f_id+14×640×8×ul_carrier_id, where s_id is the first OFDM symbol index of the selected RO (0≤s_id<14), t_id is the index of the slot where the selected RO is located (0≤t_id<640), f_id is the index value of the selected RO in the frequency domain (0≤f_id<8), and ul_carrier_id is the index of the carrier for random access (0 represents the normal uplink carrier and 1 is the supplementary uplink carrier).

Similarly, the calculation method of MSGB-RNTI may be one of the following.

MSGB-RNTI_=1+s_id+14×t_id+14×80×f_id+14×80×8× slotgroup_id+14×80×8×8×ul_carrier_id+14×80×8×8× 2, where s_id is the first OFDM symbol index of the selected RO (0≤s_id<14), t_id is the index of the slot in the slot group where the selected RO is located (0≤t_id<80), f_id is the index of the selected RO in the frequency domain (0≤f_id<8), slotgroup_id is the index of the slot group where the selected RO is located (0≤slotgroup_id<8), and ul_carrier_id is the index of the carrier for random access (0 represents the normal uplink carrier and 1 is the supplementary uplink carrier). Preferably, the slotgroup_id and the f_id may be exchanged; or MSGB-RNTI=1+s_id+14×t_id+14×640×f_id+14×640× 8×ul_carrier_id+14×80×8×8×2, where s_id is the first OFDM symbol index of the selected RO (0≤s_id<14), t_id is the index of the slot where the selected RO is located (0≤t_id<640), f_id is the index value of the selected RO in the frequency domain (0≤f_id<8), and ul_carrier_id is the index of the carrier for random access (0 represents the normal uplink carrier and 1 is the supplementary uplink carrier).

In another embodiment of the disclosure, for example, when applied to small data transmission, coverage enhancement, reduced capability (reducap), or other purposes or scenarios, a user equipment may receive a random access configuration applied to one or more of the above purposes or scenarios and thus determine the random access resource for the scenario or purpose so as to transmit an uplink signal. In this embodiment, the method is described by taking the small data transmission as an example, which may be extended to other scenarios and purposes.

The random access configuration may include a combination of one or more of the following (interchangeable).

Related configuration of random access occasion (RACH occasion, RO) including the combination of one or more of the following (interchangeable):

Random access configuration index;

A number of ROs in frequency domain;

If the SDT has a separate BWP, i.e., SDT-specific BWP, UE uses the pattern of SSB on the initial BWP to perform a judgment of validity of a RO and a mapping association for a subsequent SSB-RO when performing association of an SSB-RO.

A configuration of random access preamble (RACH preamble) including the combination of one or more of the following (interchangeable).

Number of preambles of each SSB in each RO, N_preamble.

Figure 11:
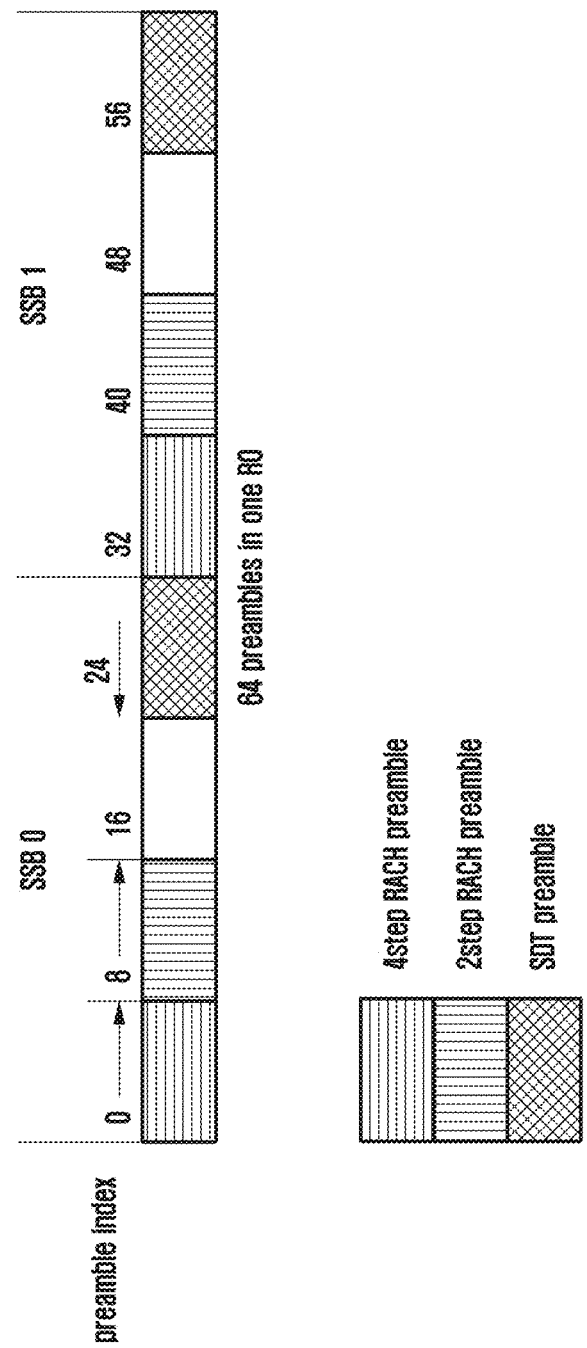
FIG. 11 illustrates a view of an example of SDT preamble configuration according to an embodiment of the present disclosure.

The starting position of the preamble of each SSB in each RO, specifically:

explicitly indicating the start index of the preamble, for example, the preambles for SDT are N_premable preambles starting from preamble 24; In particular, in order to reduce the signaling overhead, the number of starting points may be limited, for example, there are values of only 4 starting points, and may be indicated by using only 2 bits; and/or A default start position is derived, from back to front, from the end position of the preamble part of each SSB in each RO, i.e., N_premable preambles. As shown in FIG. 11, assuming that there are 64 preambles on one RO and two SSBs are mapped and associated on one RO, namely, SSB 0 and SSB 1. Then for SSB 0, the starting point of the preambles of 4step RACH is 0 and the number is 8; the starting point of the preambles of 2step RACH is the end point of 4step RACH, that is, preamble index 8, and the number is 8. For the SDT preambles of SSB 0, it is derived, from back to front, from the end of the preamble corresponding to SSB 0, that is, preamble index 31, by 8 (that is, N_preamble=8), resulting in preamble indexes 24~31. Similarly, the SDT preambles corresponding to SSB 1 may be derived, from back to front, from the end corresponding to SSB1, that is, the preamble index 63, resulting in the preamble indexes 56~63. This method will lose some flexibility compared with the previous explicit indication method, but it can reduce the signaling overhead.

PUSCH configuration information, including the combination of one or more of the following items (interchangeable):

A configured number of PUSCH occasions (POs) in time domain;

Number of POs in frequency domain.

If the SDT has a separate BWP, i.e., SDT-specific BWP, UE uses the pattern of SSB on the initial BWP to perform a judgment of validity of a RO and a mapping association for a subsequent SSB-RO when performing an association of an SSB-RO.

Figure 8:
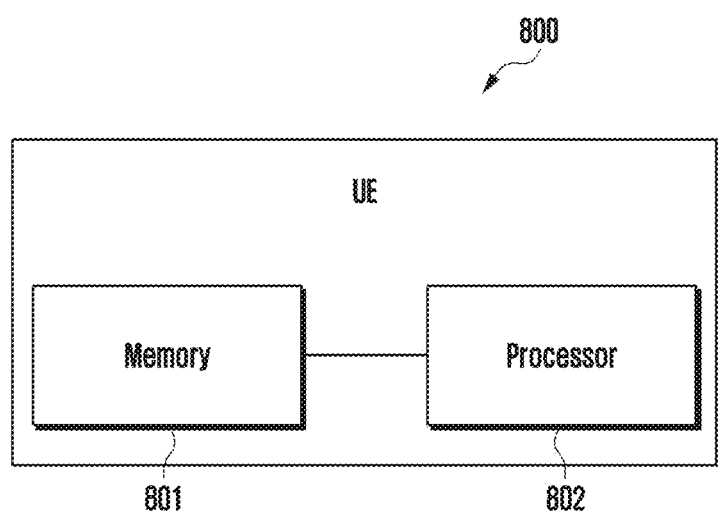
FIG. 8 illustrates a schematic view of a UE according to an embodiment of the present disclosure.

FIG. 8 illustrates a user equipment 800 according to an embodiment of the present disclosure. The user equipment includes a memory 801 and a processor 802. The memory stores computer executable instructions. When the instructions are executed by the processor, at least one method corresponding to the above embodiments of the present disclosure is executed.

Figure 9:
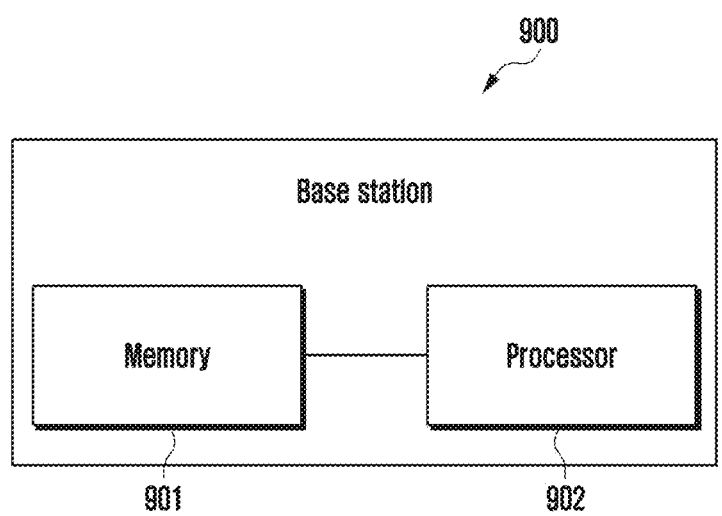
FIG. 9 illustrates a schematic view of a base station according to an embodiment of the present disclosure.
Figure 10:
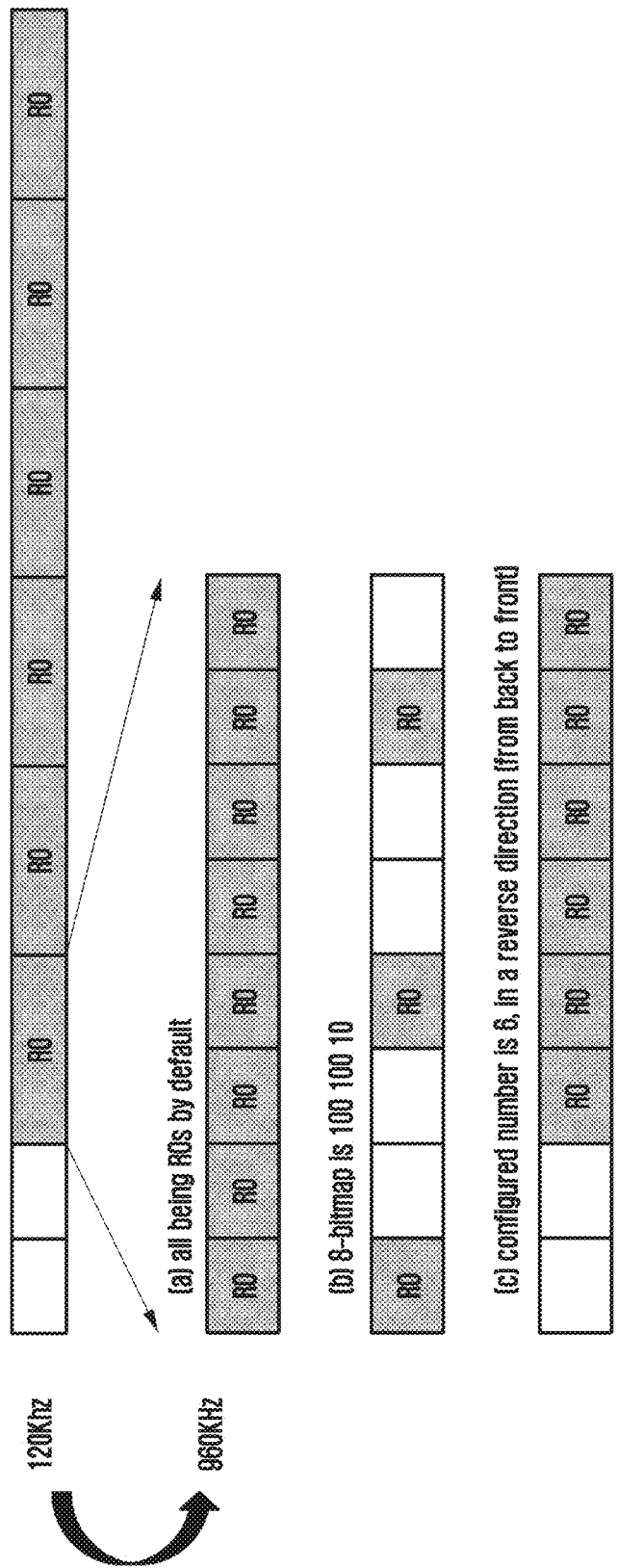
FIG. 10 illustrates a view of an example of a RO indication method for a second subcarrier spacing according to an embodiment of the present disclosure.

FIG. 9 illustrates a base station 900 according to an embodiment of the present disclosure. The base station includes a memory 901 and a processor 902. The memory stores computer executable instructions. When the instructions are executed by the processor, at least one method corresponding to the above embodiments of the present disclosure is executed.

The present disclosure also provides a computer-readable medium on which computer executable instructions are stored. When the instructions are executed, any method described in the embodiment of the present disclosure is executed.

Specifically, for example, the processor may be configured to transmit configuration information to the user equipment side (the configuration information is described above and details are omitted herein); to detect a possible random access preamble signal on the configured random access occasion; or the base station or network equipment detects the uplink signal transmitted by the user equipment on the configured uplink transmission resources.

"User equipment" or "UE" herein may refer to any terminal with wireless communication capability, including but not limited to mobile phones, cellular phones, smart phones or personal digital assistants (PDAs), portable computers, image capture devices such as digital cameras, game devices, music storage and playback devices, and any portable unit or terminal with wireless communication capability, or internet facilities that allow wireless internet access and browsing.

The term "base station" (BS) or "network equipment" used herein can refer to eNB, eNodeB, NodeB or base station transceiver (BTS) or gNB according to the technology and terminology used.

The "memory" herein may be any type suitable for the technical environment herein and may be implemented using any suitable data storage technology, including but not limited to semiconductor based storage devices, magnetic memory devices and systems, optical memory devices and systems, fixed memory and removable memory.

The processor here may be any type suitable for the technical environment herein, including but not limited to one or more of the following: general-purpose computer, special-purpose computer, microprocessor, digital signal processor DSP and processor based on multi-core processor architecture.

The above is only a preferred embodiment of the disclosure and is not intended to limit the disclosure. Any modification, equivalent replacement, improvement, etc. made within the spirit and principles of the disclosure shall be included in the protection scope of the disclosure.

It will be understood by those skilled in the art that the present disclosure includes devices for performing one or more of the operations described in the present application. These devices may be specially designed and manufactured for the desired purpose, or may include known devices in a general-purpose computer. These devices have computer programs stored therein, which are selectively activated or reconstructed. Such computer programs may be stored in a device (e.g., computer) readable medium or in any type of medium suitable for storing electronic instructions and respectively coupled to the bus, including but not limited to any type of disk (including soft disk, hard disk, optical disk, CD-ROM, and magneto-optical disk), ROM (Read Only Memory), RAM (Random Access Memory), EPROM (Erasable Programmable Read Only Memory), EEPROM (Electrically Erasable Programmable Read Only Memory), flash memory, magnetic card or light card. That is, a readable medium includes any medium in which information is stored or transmitted in a readable form by a device (E. G., a computer).

It can be understood by those skilled in the art that each frame in these structure diagrams and/or block diagrams and/or flow diagrams and the combination of frames in these structure diagrams and/or block diagrams and/or flow diagrams can be realized by computer program instructions. Those skilled in the art can understand that these computer program instructions can be provided to a general-purpose computer, a professional computer or a processor of other programmable data processing methods to implement the scheme specified in the block or multiple blocks of the structure diagram and/or block diagram and/or flow diagram disclosed by the present disclosure through a computer or a processor of other programmable data processing methods.

Those skilled in the art can understand that the steps, measures and schemes in various operations, methods and processes discussed in the disclosure can be alternately changed, combined or deleted. Further, other steps, measures and schemes in various operations, methods and processes discussed in the present disclosure can also be alternately, changed, rearranged, decomposed, combined or deleted. Further, the steps, measures and schemes in the prior art with various operations, methods and processes disclosed in the disclosure can also be alternately, changed, rearranged, decomposed, combined or deleted.

The above is only part of the embodiments of the disclosure. It should be pointed out that for ordinary technicians in the technical field, several improvements and refinements can be made without departing from the principles of the disclosure, and these improvements and refinements should also be regarded as the protection scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
    receiving first information on a physical random access channel (PRACH) configuration index and second information indicating a subcarrier spacing for a random access preamble;
    identifying a position related to the random access preamble in a time domain based on the first information and the subcarrier spacing for the random access preamble; and
    transmitting the random access preamble based on the identified position,
    wherein in case that the second information indicates one of 480 kHz and 960 kHz as the subcarrier spacing for the random access preamble, the position related to the random access preamble for one of 480 kHz and 960 kHz is identified based on a number of PRACH slots within a slot corresponding to 60 kHz, and
    wherein the number of PRACH slots within the slot is identified by the PRACH configuration index.

2. The method of claim 1, wherein the second information indicating the subcarrier spacing for the random access preamble is received via a higher layer signaling.

3. The method of claim 1, further comprising:
    determining one or more slot groups containing a random access resource corresponding to the position; and
    determining a random access occasion (RO) according to the PRACH configuration index based on the one or more slot groups,
    wherein the RO in each slot group is same.

4. The method of claim 3, wherein the determining one or more slot groups containing the random access resource comprises at least one of:
    determining one or more slot groups containing the random access resource according to an acquired bitmap indicating the one or more slot groups containing the random access resource;
    determining one or more slot groups containing the random access resource by looking up a table according to an index indication, wherein the index indication is used to indicate the one or more slot groups containing the random access resource; or,
    determining one or more slot groups containing the random access resource according to a position of a first slot group having the random access resource, a number of the one or more slot groups containing the random access resource, a position relationship and an deduction direction among the one or more slot groups containing the random access resource.

5. The method of claim 3, wherein the determining the RO comprises:
    acquiring an indication for a position of a duration T_rachduration occupied by a configured random access resource in a configured random access resource configuration period T_rachperiodicity;

determining the position of the T_rachduration in the T_rachperiodicity according to the acquired indication for the position; and determining the RO according to the PRACH configuration index based on the position of the T_rachduration in the T_rachperiodicity.

6. The method of claim 5, wherein the determining the position of the T_rachduration in the T_rachperiodicity according to the acquired indication for the position comprises:

determining the position of the T_rachduration in the T_rachperiodicity according to a configured N_rachduration_index, wherein the N_rachduration_index is a position index for the T_rachduration in one configured T_rachperiodicity.

7. A user equipment (UE), comprising:

at least processor; and a memory storing instructions executable by the at least one processor, wherein the at least one processor is configured to:
receive first information on a physical random access channel (PRACH) configuration index and second information indicating a subcarrier spacing for a random access preamble;
identify a position related to the random access preamble in a time domain based on the first information and the subcarrier spacing for the random access preamble; and
transmit the random access preamble based on the identified position, wherein in case that the second information indicates one of 480 kHz and 960 kHz as the subcarrier spacing for the random access preamble, the position related to the random access preamble for one of 480 kHz and 960 kHz is identified based on a number of PRACH slots within a slot corresponding to 60 kHz, and wherein the number of PRACH slots within the slot is identified by the PRACH configuration index.

8. The UE of claim 7, wherein
the second information indicating the subcarrier spacing for the random access preamble is received via a higher layer signaling.

9. The UE of claim 7, wherein the at least one processor is configured to:
determine one or more slot groups containing a random access resource corresponding to the position; and
determine a random access occasion (RO) according to the PRACH configuration index based on the one or more slot groups,
wherein the RO in each slot group is same.

10. The UE of claim 9, wherein the at least one processor is configured to:
determine one or more slot groups containing the random access resource according to an acquired bitmap indicating the one or more slot groups containing the random access resource;
determine one or more slot groups containing the random access resource by looking up a table according to an index indication, wherein the index indication is used to indicate the one or more slot groups containing the random access resource; or,
determine one or more slot groups containing the random access resource according to a position of a first slot group having the random access resource, a number of the one or more slot groups containing the random access resource, a position relationship and an deduction direction among the one or more slot groups containing the random access resource.

11. The UE of claim 10, wherein the at least one processor is configured to:
acquire an indication for a position of a duration T_rachduration occupied by a configured random access resource in a configured random access resource configuration period T_rachperiodicity;
determine the position of the T_rachduration in the T_rachperiodicity according to the acquired indication for the position; and
determine the RO according to the PRACH configuration index based on the position of the T_rachduration in the T_rachperiodicity.

12. The UE of claim 11, wherein the at least one processor is configured to determine the position of the T_rachduration in the T_rachperiodicity according to a configured N_rachduration_index, wherein the N_rachduration_index is a position index for the T_rachduration in one configured T_rachperiodicity.

13. A method performed by a base station in a wireless communication system, the method comprising:
determining first information on a physical random access channel (PRACH) configuration index and second information indicating a subcarrier spacing for a random access preamble;
transmitting, to a user equipment (UE), the first information and the second information; and
receiving, from the UE, a random access preamble based on a position related to the random access preamble in a time domain,
wherein the position is associated with the first information and the subcarrier spacing for the random access preamble,
wherein in case that the second information indicates one of 480 kHz and 960 kHz as the subcarrier spacing for the random access preamble, the position related to the random access preamble for one of 480 kHz and 960 kHz is associated with a number of PRACH slots within a slot corresponding to 60 kHz, and
wherein the number of PRACH slots within the slot is associated with the PRACH configuration index.

14. The method of claim 13,
wherein the second information indicating the subcarrier spacing for the random access preamble is transmitted via a higher layer signaling.

15. A base station, comprising:
at least one processor; and
a memory storing instructions executable by the at least one processor,
wherein the at least one processor is configured to:
determine first information on a physical random access channel (PRACH) configuration index and second information indicating a subcarrier spacing for a random access preamble;
transmit, to a user equipment (UE), the first information and the second information; and
receive, from the UE, a random access preamble based on a position related to the random access preamble in a time domain,
wherein the position is associated with the first information and the subcarrier spacing for the random access preamble,
wherein in case that the second information indicates one of 480 kHz and 960 kHz as the subcarrier spacing for the random access preamble, the position related to the random access preamble for one of 480 kHz and 960 kHz is associated with a number of PRACH slots within a slot corresponding to 60 kHz, and wherein the number of PRACH slots within the slot is associated with the PRACH configuration index.

16. The base station of claim 15, wherein the second information indicating the subcarrier spacing for the random access preamble is transmitted via a higher layer signaling.

* * * * *